US011106345B2

(12) United States Patent
Shedigumme et al.

(10) Patent No.: US 11,106,345 B2
(45) Date of Patent: *Aug. 31, 2021

(54) INTEGRATING RELATED THIRD-PARTY SERVICES USING DYNAMICALLY GENERATED USER INTERFACES

(71) Applicant: VMware, Inc., Palo Alto, CA (US)

(72) Inventors: Shree Harsha Shedigumme, Bengaluru (IN); Sudharsan Thumatti Sathiamoorthy, Bengaluru (IN); Amit Jain, Bengaluru (IN); Ashish Agrawal, Bengaluru (IN); Sharun Varghese Samuel, Bengaluru (IN); Shaleen Mittal, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/354,743

(22) Filed: Mar. 15, 2019

(65) Prior Publication Data

US 2020/0293185 A1 Sep. 17, 2020

(51) Int. Cl.
*G06F 9/451* (2018.01)
*G06F 3/0484* (2013.01)
*G06F 16/903* (2019.01)
*G06F 21/31* (2013.01)
*G06F 8/38* (2018.01)

(52) U.S. Cl.
CPC ............ *G06F 3/04847* (2013.01); *G06F 8/38* (2013.01); *G06F 9/451* (2018.02); *G06F 16/903* (2019.01); *G06F 21/31* (2013.01)

(58) Field of Classification Search
CPC .. G06F 3/048; G06F 16/9535; G06F 16/9038; G06F 21/31; G06F 3/04847; G06F 9/451; G06F 16/903; G06F 8/38
See application file for complete search history.

(56) References Cited

U.S. PATENT DOCUMENTS

| 9,996,509 | B1 | 6/2018 | O'Connor et al. | |
| 10,331,502 | B1* | 6/2019 | Hart | ............................ G06F 9/54 |
| 2003/0023463 | A1* | 1/2003 | Dombroski | ............. G06Q 10/02 705/5 |
| 2005/0193011 | A1* | 9/2005 | Peebles | ................ G06Q 10/109 |
| 2011/0010656 | A1* | 1/2011 | Mokotov | ............... G06Q 10/10 715/780 |
| 2011/0047590 | A1 | 2/2011 | Carr et al. | |
| 2012/0240085 | A1* | 9/2012 | Sim | .......................... G09B 5/14 715/864 |
| 2013/0091453 | A1* | 4/2013 | Kotler | ................ G06Q 30/0209 715/772 |

(Continued)

*Primary Examiner* — Mahelet Shiberou
(74) *Attorney, Agent, or Firm* — Thomas | Horstemeyer, LLP

(57) ABSTRACT

Disclosed are various approaches for connecting third-party services for user interaction. A user can select content on a user interface associated with a first third-party service. The content can be associated with a second third-party service. A client application can transmit the content to an integrated service over a network in a request to obtain additional information from the second third-party service. The integrated service can transmit the additional information to the client application. The user interface can be modified to include a user interface element containing the information associated with the second third-party service.

20 Claims, 10 Drawing Sheets

(56) References Cited

U.S. PATENT DOCUMENTS

| | | | |
|---|---|---|---|
| 2013/0179833 A1* | 7/2013 | Stallings | G06F 3/0482 |
| | | | 715/810 |
| 2013/0204993 A1* | 8/2013 | Uribe-Etxebarria Jimenez | |
| | | | H04L 41/50 |
| | | | 709/223 |
| 2015/0193392 A1* | 7/2015 | Greenblatt | G06Q 10/109 |
| | | | 715/205 |
| 2015/0278876 A1 | 10/2015 | Xiong et al. | |
| 2016/0156774 A1 | 6/2016 | Campbell | |
| 2017/0371532 A1* | 12/2017 | Panchapakesan | H04L 67/20 |
| 2018/0218405 A1 | 8/2018 | Lewis et al. | |
| 2018/0276053 A1* | 9/2018 | Kesavan | H04L 67/20 |
| 2019/0196682 A1* | 6/2019 | Madafferi | G06F 16/958 |
| 2019/0197189 A1* | 6/2019 | Studnicka | G06F 16/3334 |

* cited by examiner

INTEGRATING RELATED THIRD-PARTY SERVICES USING DYNAMICALLY GENERATED USER INTERFACES

BACKGROUND

Users in an enterprise environment often engage with one or more network-accessible services hosted by third parties. For instance, a user can engage with a customer relationship management service, a task tracking service, an accounting service, a source code management service, and so forth. As part of using these services, the users may wish to communicate to the service information that is available through another application. This information can include files, uniform resource locators (URLs), email messages, and contact information (e.g., names, email addresses, telephone numbers, etc.). As an example, a user may want to know author details in response to seeing an email address while browsing a tech documentation in a software collaboration tool. As another example, a user may want to provide a comment to a task tracking service in response to interacting with a software development project. Without a form of integration between the client application and the third-party service, users are left to manually copy the information from the client application and then manually enter it through a user interface of the third-party service (e.g., another client application or a browser).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
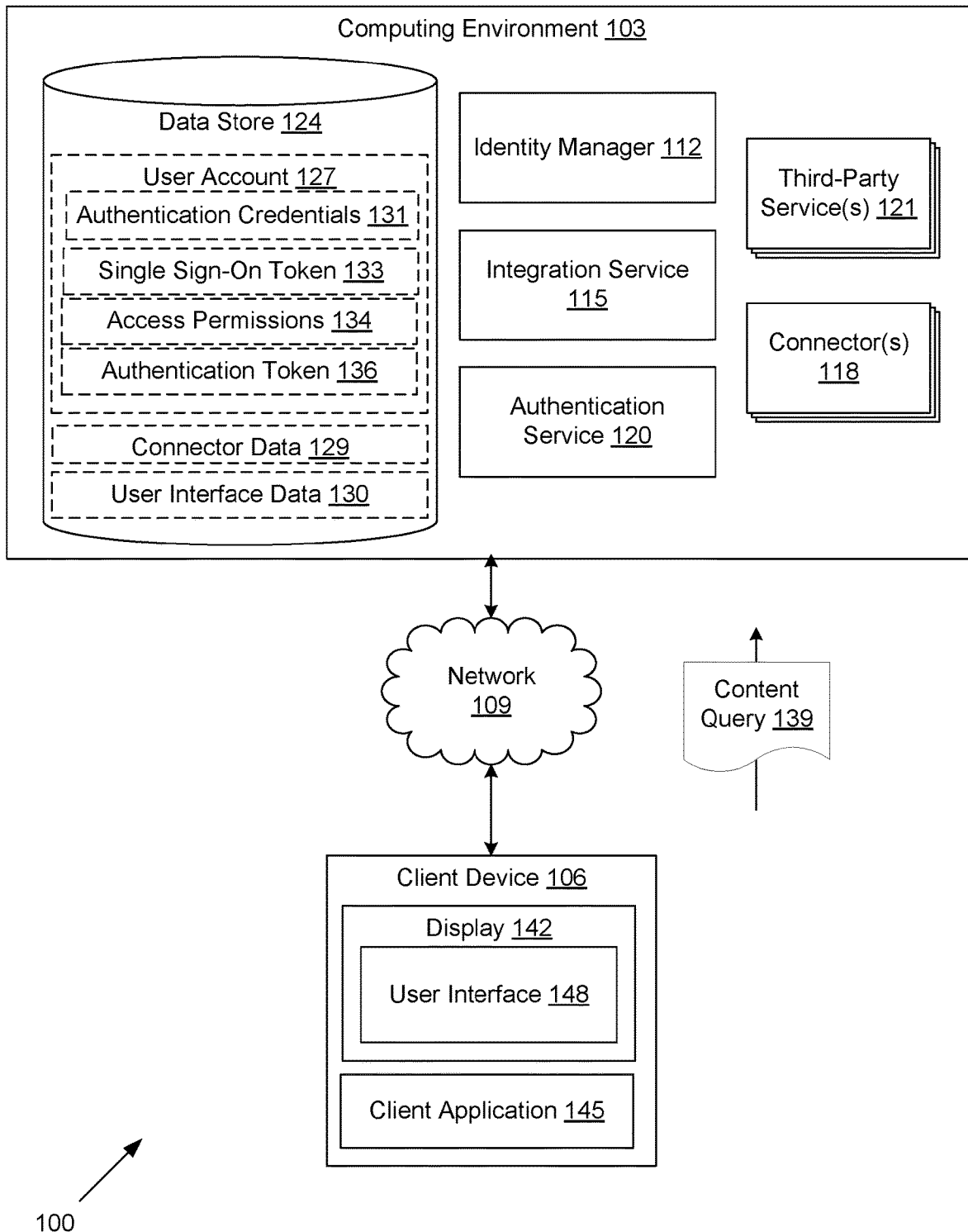
FIG. 1 is a schematic block diagram depicting an example of a network environment.

The present disclosure relates to integrating related third-party services to allow a user interacting with a third-party service access to information associated with one or more related third-party services. In particular, a user interacting with a user interface of a given third-party service using a browser or other client application can identify text-based content that is associated with another third-party service. If the user selects the content, additional information associated with the content can be obtained from the other third-party service using backend functionality. The user interface can be modified to include the additional information while allowing the user to stay connected with the original third-party service. When a user wants to obtain additional information, the user does not have to leave the current workspace to view or access the desired information, as the desired information can be integrated with the current workspace of the user.

In an enterprise setting, various services can be related to one another. For example, a software development service and a cloud-based software repository can correspond to distinct services used in an enterprise setting and can both include information associated with the same project. In another example, an email service can be used to send an email to a party associated with a user whose email address is displayed in the content of a networking service. In another example, an internal enterprise webpage can include a link to video that is played using a content player service. In each of these examples, the user typically needs to leave the website or user interface associated with one of the third-party services to access the information associated with the related third-party service. Accordingly, it can be beneficial to introduce an integration service that can facilitate communication between a client application and related third-party services while allowing the user to obtain information from the related third-party service without leaving the current website.

In terms of integrations of third-party services, for example, a user can access a pull request associated with a software development service to view a review page that includes changes, comments, and other information associated with a project. The pull request review page can include an identifier for an information card from a cloud-based software bug repository. The information card can include information about a submitted bug associated with the project. Typically, the user would have to leave the pull request interface in the software development service to access the cloud-based software bug repository to view the submitted bug information and any comments associated with the bug.

A user can highlight the identifier in the user interface of the software development tool, and in response, be presented with a user interface element that is integrated within the original user interface and includes the desired information from the cloud-based software bug repository. In this situation, the client application can send a content query including the highlighted text to an integration service of a backend system. The integration service can then identify the third-party service associated with the content query based on a comparison of the content query with predefined data. In response to identifying the third-party service, the integration service can access the additional information and provide the information to the client application. This information can be presented in a user interface element that can be integrated within the original user interface such that the user still has access to user interface content of the software development tool. The user interface element can include a pop-up box, a moveable panel, or other type of user interface component.

In another example, a user can be browsing through a collaboration software service (e.g., CONFLUENCE) that includes software code written by one or more authors. The user may wish to ask an author of the software code a question. The user can highlight an email identifier associated with the author of the code. In response to the user highlighting the email identifier, the user interface can be modified to include a user interface element that corresponds to a messaging service (e.g., SLACK) to allow the user to communicate with the author without leaving the website associated with the collaboration software service. In this situation, the client application transmits a content query including the selected email identifier to the integration service of the backend system. The integration service can compare the email identifier with predefined data that is mapped to different services to determine which third-party service can provide information associated with the content query. In response, the integration service can provide a connection between collaboration software service and the messaging service to allow the user to message the author while still maintaining access with the collaboration software service.

Beginning with FIG. 1, shown is an example of a networked environment 100. The networked environment 100 includes a computing environment 103 and a client device 106, which are in data communication with each other across a network 109. The network 109 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 112, an integration service 115, one or more connectors 118, and an authentication service 120. One or more third-party services 121 can also be executed in the computing environment 103. In some embodiments, however, one or more of the third-party services 121 can be executed in a separate computing environment that is in data communication with the computing environment 103 across the network 109.

Also, various data is stored in a data store 124 that is accessible to the computing environment 103. The data store 124 can be representative of a plurality of data stores, which can include relational databases, object-oriented databases, hierarchical databases, hash tables or similar key-value data stores, as well as other data storage applications or data structures. The data stored in the data store 124 is associated with the operation of the identity manager 112, the integration service 115, the connectors 118, the authentication service 120, and one or more of the third-party services 121, as well as potentially other applications or functional entities described later. This data can include one or more user accounts 127, connector data 129, user interface data 130, and potentially other data.

The identity manager 112 can authenticate users and manage user authorizations or permissions to access applications, data, or other computing resources. For example, the identity manager 112 can correspond to a single sign-on portal that verifies a user's authentication credentials 131, issues a single sign-on authentication token 133 that identifies the user, and verifies whether the user has the appropriate access permissions to access one or more third-party services 121. Examples of identity managers 112 include AMAZON's AWS Identity and Access Management (IAM) service, VMWARE's Identity Manager, or MICROSOFT's Active Directory Federation Services.

The authentication service 120 can retrieve and cache authentication data, such as authentication tokens 143 and refresh tokens, provided by various third-party services 121. The cached authentication data can be used by the integration service 115 to query the third-party services 121 for information.

The integration service 115 can dynamically integrate client applications 145 of client devices 106 with third-party services 121. Specifically, when a user initiates a selection of content within a user interface 148 of a client application 145, the client application 145 can then send a content query 139 associated with the selection of content to the integration service 115. The integration service 115 can receive a content query 139 from the client application 145 that corresponds to content selected by the user. The content can include one or more terms displayed in a user interface 148 of the client application 145. The integration service 115 can compare the content query 139 with the connector data 129 to determine if the content query 139 is associated with a particular connector 118 and third-party service 121. If a match is detected, the integration service 115 can send a request to the identified connector 118 to access data from the third-party service 121 associated with the connector 118. The integration service 115 can receive the requested data from the connector 118 and provide the data to the client application 145.

In some scenarios, the integration service 115 can generate a user interface element 203 (FIGS. 2B-2D) that includes the requested data provided by a third-party service 121 and transmit the user interface element 203 to the client device 106. In some examples, the user interface element 203 can include a pop-up window that is rendered over the user interface 148 such that the original content is still accessible to the user. In another example, the user interface element 203 can include a panel or other type of component that can be integrated into the original user interface 148 and can allow the user to view the panel contents while still having access to the content of the original user interface 148. In this example, the panel can include a visible portion of content and a hidden portion of content. When a user interacts with the panel by pulling the panel in a given direction, the hidden portion of the content received from the second third-party service 121 can be exposed. In some examples, the exposed content of the second third-party service content can cover a portion of the window including the content included in the original user interface 148. As the panel is returned to the original position, the content of the original user interface is exposed.

In some examples, the integration service 115 can transmit user interface code and the data received from the third-party service 121 to the client application 145, and the client application 145 can generate the user interface element 203 according to the user interface code and third-party service data.

A connector 118 can provide a standardized mechanism for the integration service 115 to communicate with a third-party service 121. Each third-party service 121 can provide an application programming interface (API) for communicating, querying, or otherwise interacting with the third-party service 121, which can include different methods or functions with different parameters compared to other third-party services 121. This can allow for the integration service 115 to send a single, uniformly formatted query to one or more connectors 118. Each connector 118 is then responsible for using the information provided in the query from the integration service 121 to invoke the appropriate functions provided by the API of the third-party service 121. To add support for a new third-party service 121, a new connector 118 can be created without needing to modify the integration service 115 itself. Likewise, if a change is made to the API of the third-party service 121, the connector 118 between the integration service 115 and the third-party service 121 can be updated without having to modify the integration service 115 itself.

A third-party service 121 can be a web application, web service, or other network facing application that can be accessed using a shared identity manager 112. In some examples, a third-party service 121 can include enterprise-specific applications, device management applications, social networking applications, word processors, spreadsheet applications, media player applications, or other applications. One or more third-party services 121 can be provided by the same provider or by different providers. Example third-party services 121 can include SALESFORCE, JIRA, CONCUR, FACEBOOK, GITHUB, SERVICENOW, VMWARE WORKSPACE ONE, LINKEDIN, and other types applications.

The user account 127 represents information associated with a user. The information can include one or more authentication credentials 131, one or more single sign-on tokens 133, and one or more access permissions 134 applied to the user account, as well as cached authentication tokens 136. Other information about the user can also be stored as part of the user account 127, such as the user's name or contact information.

The authentication credentials 131 represent the credentials that a user can present to the identity manager 112 to authenticate the user's identity. Authentication credentials 131 can include a combination of a username and password, a cryptographic certificate, a one-time password, or a combination of several of authentication credentials 131 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 133 is a software token generated by the identity manager 112 in response to a successful authentication of the user with the identity manager 112 using the authentication credentials 131. The SSO token 133 can be used to provide the client device 106 access to various third-party services 121 on behalf of the authenticated user. In some instances, such as those implementing a version of the KERBEROS protocol, a separate SSO token 133 can be generated for each third-party service 121 that the client device 106 attempts to access on behalf of the user. In other instances, the single SSO token 133 can be generated and used to provide the client device 106 with access to several of the third-party services 121. Although each of the third-party services 121 can have a different set of authentication credentials 131 linked to the user account 127, such as a different user name and password combination, the SSO token 133 allows the user to authenticate once with the identity manager 112 in order to use each of the third-party services 121 of having to authenticate with each of the third-party services 121 separately.

The access permissions 134 represent computing resources that the user account is authorized to access. For example, the access permissions 134 can indicate that a user account is permitted to access some third-party services 121 but is prohibited from accessing other third-party services 121. As another example, the access permissions 134 can indicate that the user account 127 is allowed to access certain features of a third-party service 121, but prohibited from accessing other features.

The authentication token 136 is a token provided by one of the third-party services 121 in response to a successful authentication with the third-party service 121. The authentication token 136 represents that a user account 127 is currently authenticated by the third-party service 121 and authorized to access or otherwise interact with the third-party service 121 in some capacity. For security purposes, the authentication token 136 often has a time-limit associated with it, such as 1 hour, 3 hours, 6 hours, 8 hours, or some other period of time. Once the time-limit has expired, the authentication token 136 can no longer be used to prove current authentication status of the user account 127 with the third-party service 121. The authentication token 133 can be provided, for example, as part of an authentication exchange using a version of the OAUTH protocol, the SAML protocol or other suitable protocol.

The connector data 129 includes data that can be used to determine which connector 118 to use in response to a content query 139 received from a client device 106. The connectors 118 can be mapped to different keywords and structures identified in the connector data 129. For example, the connector data 129 can include a directory of keywords that can be associated with different third-party services 121 and connectors 118. In some examples, the integration service 115 can compare a received content query 139 from the client device 106 with the list of keywords to identify which connector 118 to use to access information that the user of the client device 106 is requesting. If one or more terms in a content query 139 match a keyword in the connector data 129, the integration service 115 can identify the connector 118 mapped to the keyword and request data from the required third-party service 121 using the appropriate connector 118. In another example, the connector data 129 can include a content structure that can be mapped to a particular connector 118. For example, the content structure can include a defined structure or layout of terms that can be unique to a particular third-party service 121.

User interface data 130 can include images, text, code, graphics, audio, video, and other content that can be served up by the integration service 115 or other suitable software component in the computing environment 103. To this end, user interface data 130 can include static network content or static elements of network content, for example, in hypertext markup language (HTML), extensible markup language (XML), or any other language suitable for creating network content. Further user interface data 130 can include code that generates dynamic user interfaces when executed or interpreted in the computing environment 103. Such code can be written in any suitable programming language, such as PHP, Perl, Objective C, Java, Ruby, etc. User interface data can also include code configured to be executed or interpreted within a client device 106 in order to render dynamic network content or user interface elements. Such code can be referred to as applets and can be written in any suitable programming language, such as JavaScript, Java, etc.

The client device 106 is representative of a plurality of client devices 106 that can be coupled to the network 109. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 142, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can execute various applications such as one or more client applications 145. The client application 145 can render a user interface 148 on the display 142. The client application 145 can represent various types of applications executable by the client device 106. For example, the client application 145 could be a web browser and the user interface 148 could include a web page rendered within a browser window. As another example, the client application 145 could be an email application and the user interface 148 could represent a graphical user interface for viewing, editing, and composing emails. Likewise, the client application 145 could be a chat or messaging application, and the user interface 148 could represent a graphical user interface for sending and receiving messages with another user.

Next, a general description of the operation of the various components of the networked environment 100 is provided. To begin, a user of the client device 106 authenticates with the identity manager 112. For example, the identity manager 112 can generate and send a webpage to a browser executing on the client device 106. The user can use the webpage to submit his or her authentication credentials 131 to the identity manager 112. The identity manager 112 can then determine whether the submitted authentication credentials 131 match the authentication credentials 131 stored for the user account 127. If the authentication credentials 131 match, the identity manager 112 determines that the user is authenticated. In response, the identity manager 112 can generate an SSO token 133 to represent the authenticated user. In some embodiments, the identity manager 112 can also notify the authentication service 120 of the authentication event. In these embodiments, the notification can include a user identifier and the SSO token 133. In other embodiments, the identity manager 112 can instead provide the SSO token 133 to the client application 145 executing on the client device 106. In these embodiments, the client application then provides the SSO token 133 to the authentication service 120.

The authentication service 120 can then authenticate the user with one or more of the third-party services 121 in the background. For example, the authentication service 120 can send the user's SSO token 133 to each third-party service 121 that an access permission 134 indicates a user is authorized to access. In other instances, the authentication service 120 can send the user's SSO token 133 to every third-party service 121 that is registered with the identity manager 112. In some embodiments, the SSO token 133 can be included in an authentication request that complies with a version of the OAUTH protocol, the SAML protocol or other suitable protocol.

In response to an authentication request from the authentication service 120, the third-party service verifies that the user account 127 associated with the SSO token 133 is allowed to access the third-party service 121. For example, the third-party service 121 can query the data store 124 to retrieve a username or other user identifier for the user account 127 associated with the single sign-on token 133. The third-party service 121 can then compare the retrieved username or other user identifier with its own list of registered or authorized users. If the retrieved username or other user identifier matches a username or user identifier stored in the list of registered or authorized users maintained by the third-party service 121, then the third-party service 121 can determine that the user account 127 linked to the SSO token 133 is authorized to access the third-party service 121. Upon successful authorization, the third-party service 121 can generate an authentication token 136 and provide them to the authentication service 120. In some instances, the authentication token 136 can be included in a response that complies with a version of the OAUTH protocol, the SAML protocol or other suitable protocol.

The authentication service 120 can then cache or otherwise store the authentication token 136 for future use. The authentication service 120 can, for example, provide the authentication token 136 in response to requests from authorized applications. For example, the authentication service 120 can provide the authentication token 136 for the user in response to a request from the integration service 115.

Meanwhile, after the user has authenticated with the identity manager 112, the user can begin using a client application 145 executing on the client device 106. For example, the user can open an email application to access email. In another example, the user can open a browser that provides access to a particular service 121 in an enterprise-supported workspace. For example, the user can open a browser to access a software development service that allows the user to review and develop software code associated with an enterprise.

As the user interacts with the user interface 148 of the client application 145, the user can select a portion of displayed content. The client application 145 can detect the selection of content and determine whether the selection of content should be transmitted to the integration services 115. For example, if the content remains selected, or otherwise highlighted, over a predefined period of time, the client application 145 can determine that the highlighted content should be transmitted to the integration service 115 in the form of a content query 139.

The client application 145 can transmit the content query 139 including the selected content over the network 109 to the integration service 115. The content query 139 can include a character string, image, or other type of identifier to represent the selected content associated with the highlighted content.

The integration service 115 then determines if there is a connector 118 associated with the content query 139. For example, the integration service 115 can parse through the content query 139 to identify one or more terms and compare the one or more terms with a list of predefined keywords in the connector data 129.

In some examples, the integration service 115 can parse through the content query 139 to identify a particular structure of the content query 139. In this example, the identified structure can be compared to different predefined structures that correspond to different connectors 118 and third-party services 121. For example, if the highlighted content includes the text "ABC-123," the integration service 115 can determine that the structure corresponds to three letters followed by an em dash character and then three numbers. The integration service 115 can compare the identified structure with a list of structures in the connector data 129. If the identified structure matches one of the structures included in the connector data 129, the integration service 115 can determine that the identified structure is associated with the connector 118 identified in the connector data 129 for the matching structure.

Upon identifying a connector 118 associated with the content query 139, the integration service 115 can check the access permissions 134 to determine if the user is allowed access to the third-party service 121 associated with the identified connector 118. Assuming the user is authorized to access the third-party service 121, the integration service 115 then provides the SSO token 133 (or authentication token 136) and the content query 139 to the identified connector 118 for the third-party service 121 that the user is permitted to access.

The connector 118 then invokes the API of the respective third-party service 121 to retrieve the data associated with the content query 139. The third-party service 121 obtains the related information associated with the content query 139 to the connector 118 in response. The connector 118 then provides the requested data received from the third-party service 121 to the integration service 115. The integration service 115 then provides the data to the client application 145.

In some examples, the integration service 115 generates a user interface element 203 including the information received from the third-party service 121 and transmits the user interface element 203 to the client application 145. In other examples, the integration service 115 transmits user interface code and the information received from the third-party service 121 to the client application 145, and the client application 145 generates the user interface element 203 based on the user interface code and third-party service data. The client application 153 then displays the requested data within the user interface element integrated with the user interface 148 or rendered over the user interface 148.

Figure 2A:
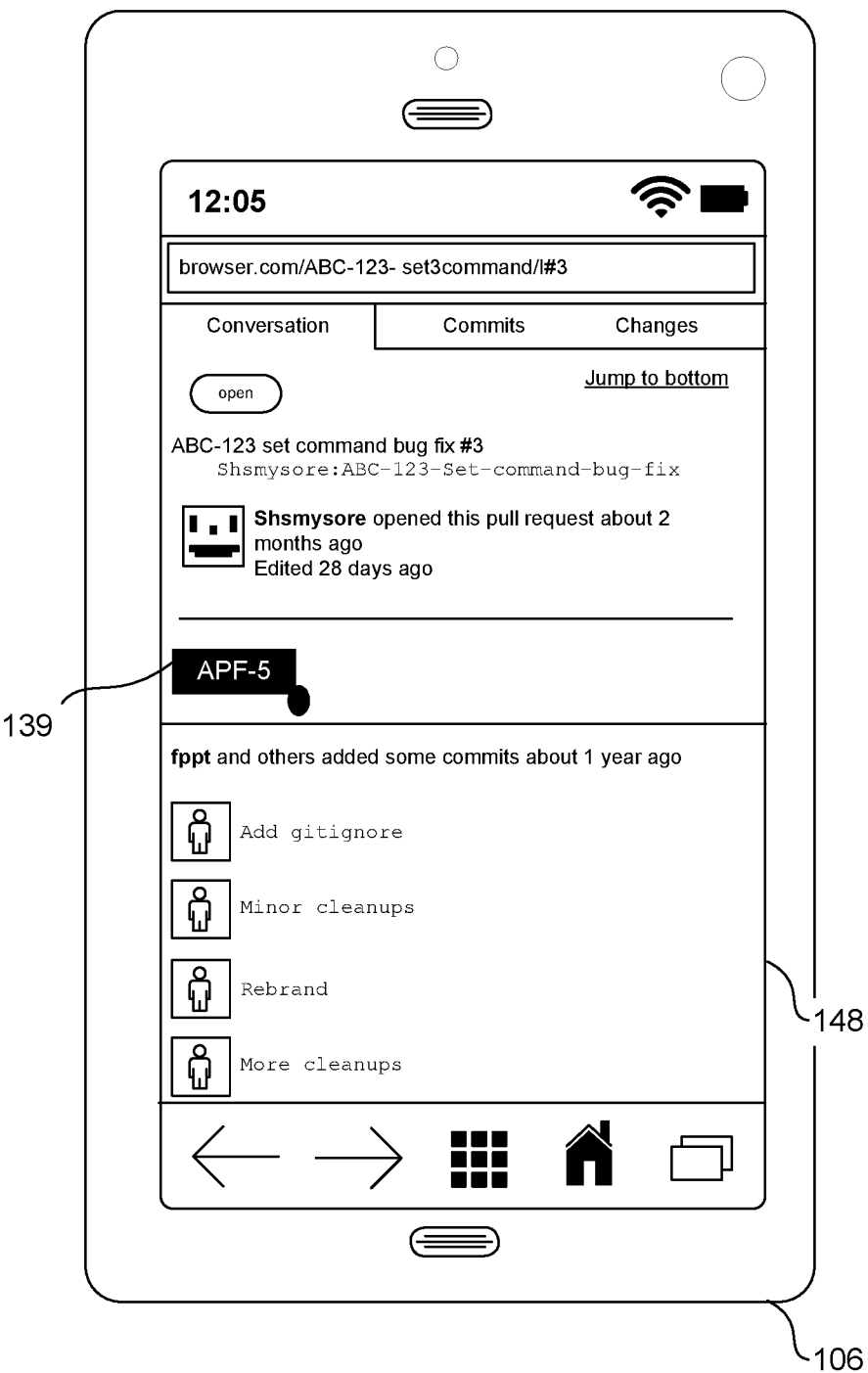
FIGS. 2A-2D are examples user interfaces of a client application executed on a client device of the network environment of FIG. 1.

FIGS. 2A-2D illustrate examples of user interfaces 148 associated with the client application 145 executed on the client device 106. In particular, FIG. 2A illustrates an example of a user interface 148 rendered on a client device 106. For example, a user can open a browser that provides access to a particular third-party service 121, and the user interface 148 can correspond to a user interface 148 associated with the third-party service 121. In the example of FIG. 2A, the third-party service 121 includes a software development collaboration tool (e.g., GITHUB) that can provide information about the current status of a particular software project. In the example of FIG. 2A, the user interface 148 includes a ticket identifier (e.g., ABC-123) associated with a cloud-based software repository service (e.g., JIRA). The ticket identifier is highlighted in FIG. 2A and is referred to as a content query 139 as it is selected content in the user interface 148.

According to various examples, the client application 145 can transmit the highlighted content query 139 to the integration service 115 in the computing environment 103. The integration service 115 can act as an intermediary to obtain information from the other third-party service 121 using the appropriate connector 118 and provide the additional information to the client device 106 while allowing the user to continue to have access to the content of the original user interface 148.

Figure 2B:
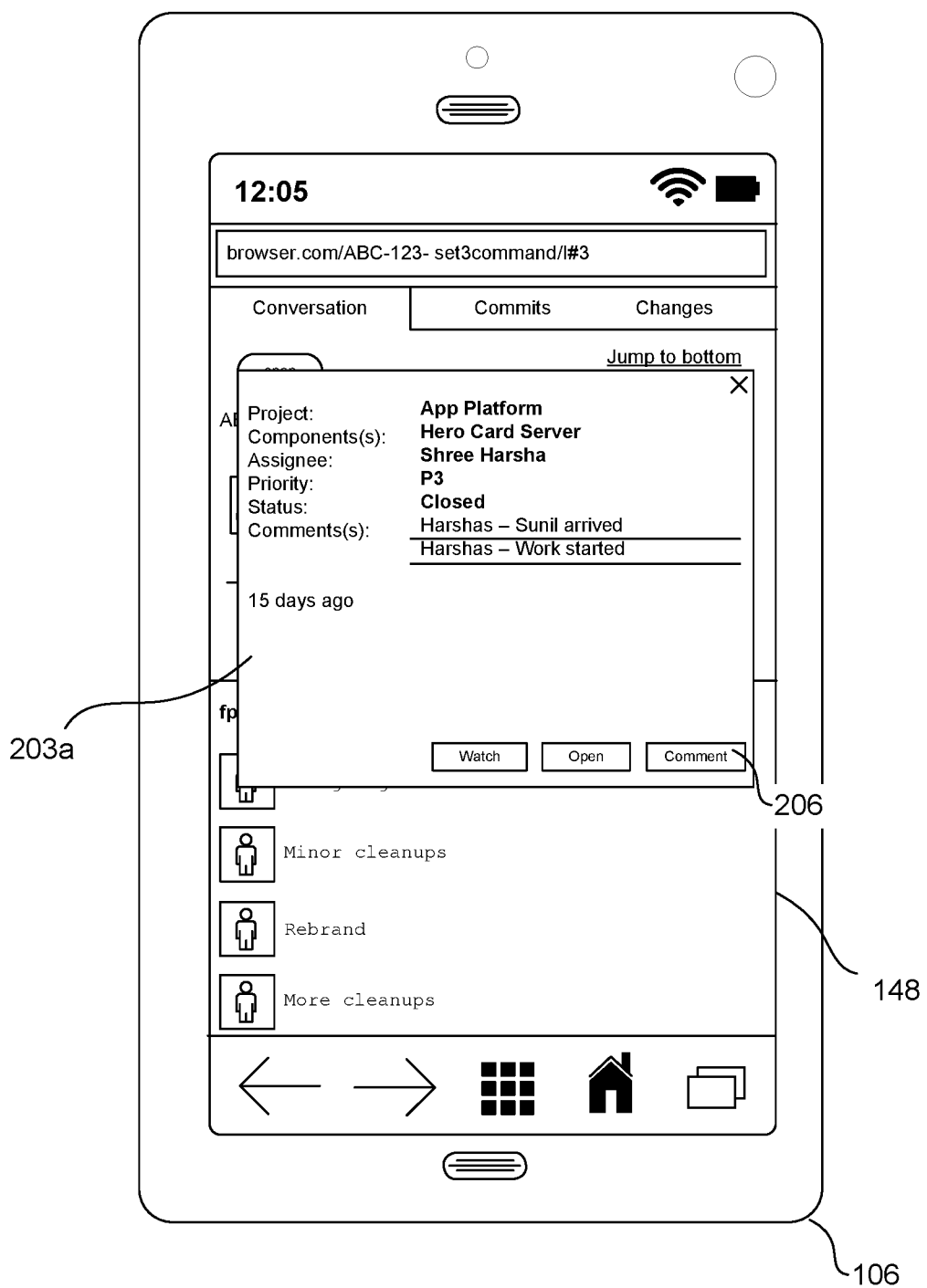

FIG. 2B illustrates an example of a user interface element 203a rendered over a user interface 148. In this example, the user interface element 203a includes a pop-up box that is rendered over the original user interface 148. The user interface element 203a includes information that is associated with the content query 139 of FIG. 2A. In this example, the user interface element 203a includes data that is obtained from a third-party service 121 that is different from the third-party service 121 associated with the user interface 148 of FIG. 2A. The user interface element 203a includes selectable components 206 that allows the user to interact with the second third-party service 121. When the user has obtained the desired information from the user interface element 203a or the user no longer needs access to the information included in the user interface element 203a, the user can close the user interface element 203a and continue interacting with the content of the original user interface 148 that is associated with the first third-party service 121.

Figure 2C:
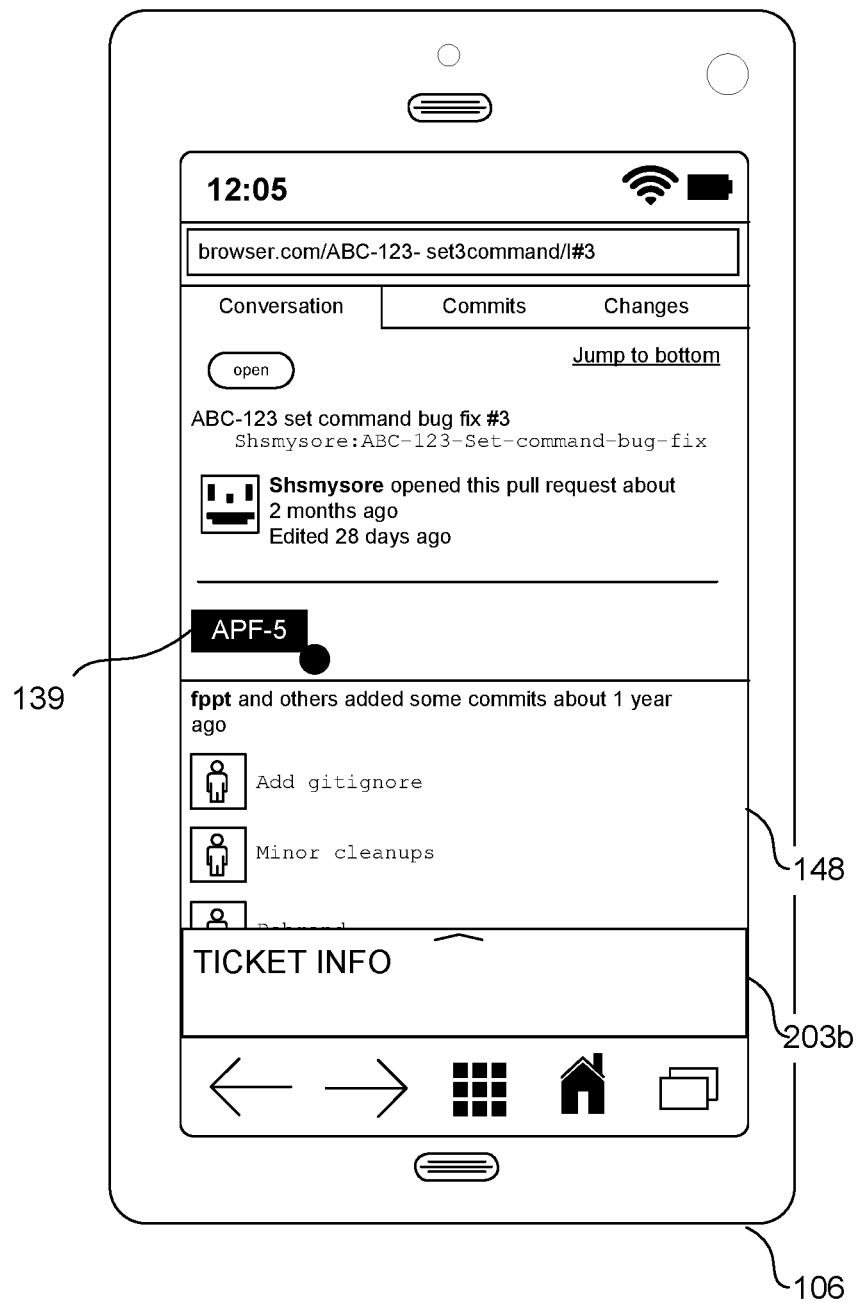
Figure 2D:
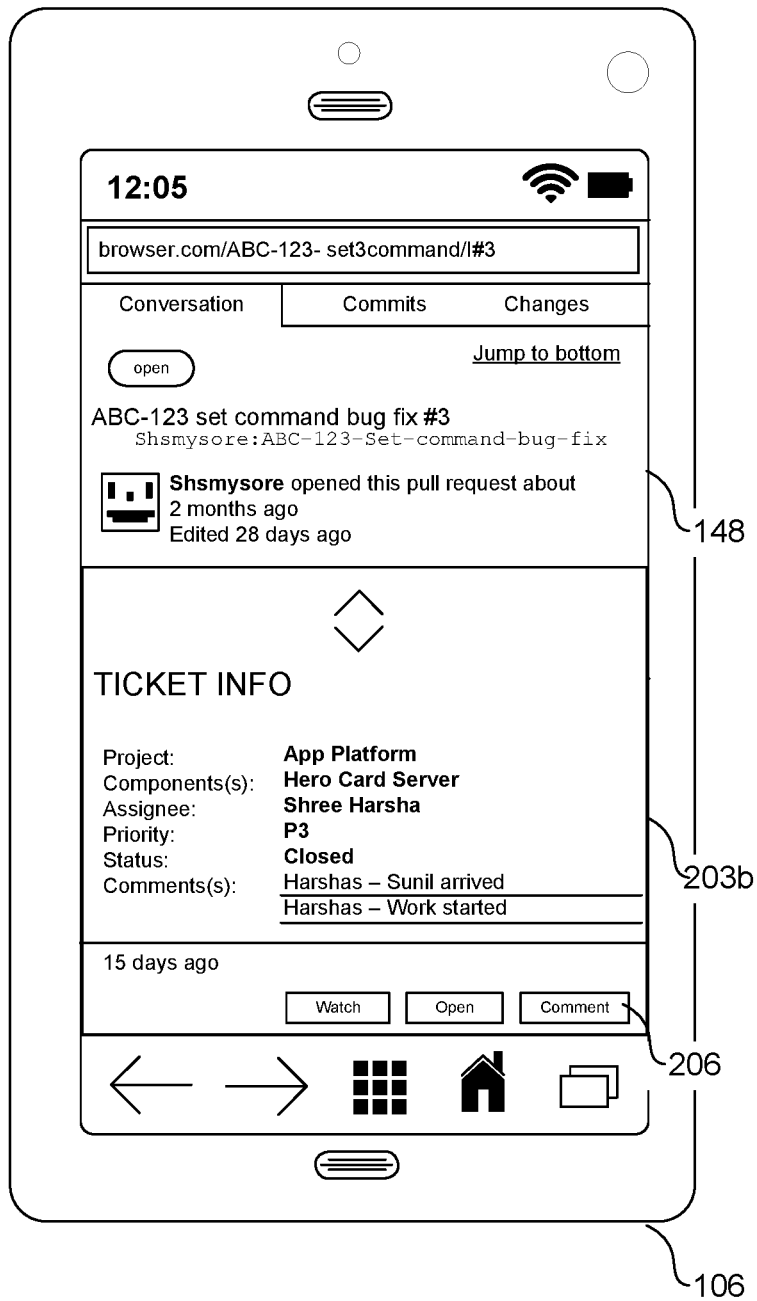

Moving on to FIGS. 2C and 2D, shown are other examples of a user interface element 203b integrated with the user interface 148 of FIG. 2A. In response to the selection of the content query 139, the user interface 148 can be modified to include the user interface element 203b that includes content associated with a different third-party service 121. In this example, the user interface element 203b includes a panel that includes a visible portion of content and a hidden portion of content. When a user interacts with the panel component by pulling the panel in a given direction, the hidden portion of the content received from the second third-party service 121 can become visible. In the examples of FIGS. 2C and 2D, as the panel component is moved upward by the user, the content included in the user interface element 203b is exposed as shown in FIG. 2D, and the content from the original user interface 148 is at least partially hidden. As the panel is moved downward to the original position, the content in the user interface element 203b is at least partially hidden allowing the user to access the content from the original user interface 148. When the user has access to the content in the user interface element 203, as shown in FIG. 2D, the user can interact with the second third-party service 121 using the selectable components 206 included in the user interface element 203b.

Figure 3:
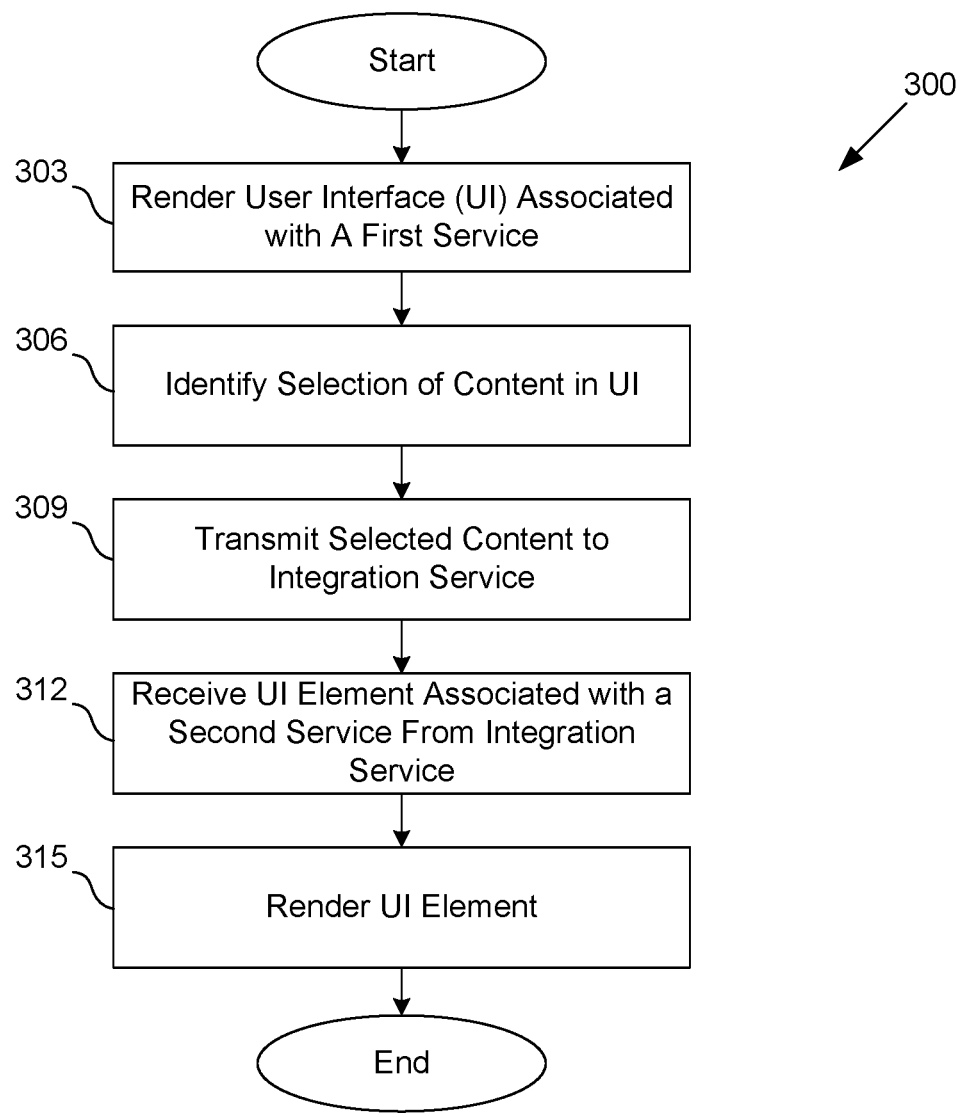
FIG. 3 is a flowchart depicting the operation of an example of a component of the client device of the network environment of FIG. 1.

Turning now to FIG. 3, shown is a flowchart 300 that provides one example of the operation of a portion of the client device 106.

Beginning at step 303, the client application 145 renders a user interface 148 associated with a first third-party service 121. For example, the user can open an email application to access email or the user can open a browser that provides access to a particular third-party service 121.

At step 306, the client application 145 identifies a selection of content in the user interface 148. For example, the content can include text, images, or other types of content that is included in the user interface 148 of the client application 145. As the user interacts with the user interface 148, the user can highlight, or otherwise select, a portion of content in the user interface 148. The client application 145 can identify this selection of content as a content query 139.

At step 309, the client application 145 transmits the selected content to the integration service 115 over the network 109. In some examples, the selected content is transmitted as a request for additional information. This additional information can be associated with a second third-party service 121.

At step 312, the client application 145 receives a user interface element 203 associated with the second third-party service 121 from the integration service 115. The user interface element 203 includes information associated with the selected content that was provided by the second third-party service 121.

At step 315, the client application 145 renders the user interface element 203 associated with the second third-party service 121 in connection with the rendering of the user interface 148 associated with the first third-party service 121. The user interface element 203 provides the user information associated with the second third-party service 121 while still providing the user access to the user interface 148 associated with the first third-party service 121. For example, the user interface element 203 can include a pop-up box that is rendered over the user interface 148 such that the user can still have access to the content of the original user interface 148 by closing the pop-up box.

In another example, the user interface element 203 can include a panel integrated within the user interface 148 that includes hidden content that is accessible when the user interacts with the panel. For example, the user can select the panel and expose the hidden content within the panel by movement of the panel in an upward, downward, or sideways direction. As the user moves the panel, the content of the panel can begin to cover the content of the underlying user interface 148. However, as the user returns the panel to the original position, the content of the original user interface 148 is exposed. Thereafter, the process can proceed to completion.

Figure 4:
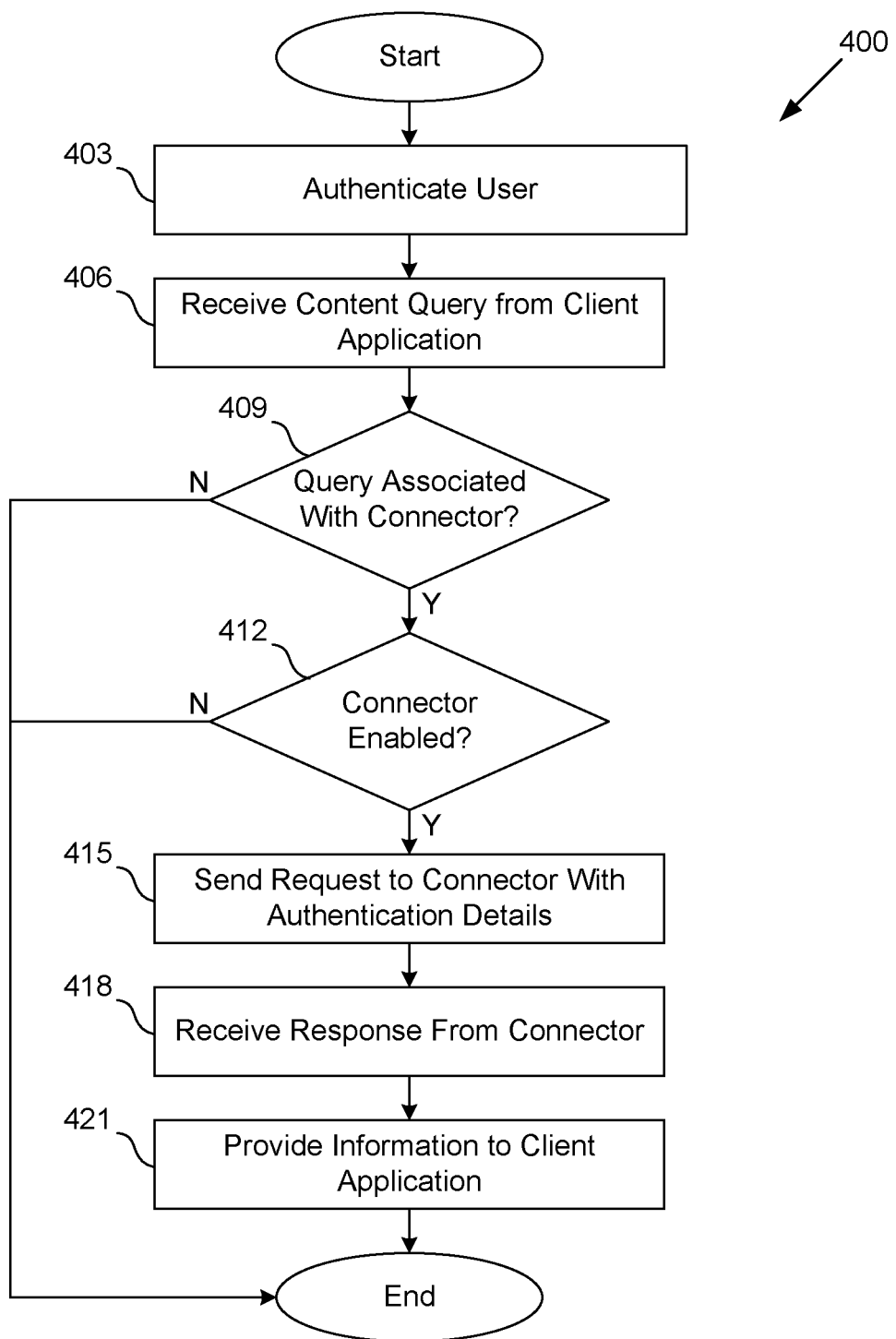
FIG. 4 is a flowchart depicting the operation of an example of a component of the computing environment of the network environment of FIG. 1.

Moving on to FIG. 4, shown is flowchart 400 that provides one example of the operation of a portion of the computing environment 103.

Beginning with step 403, the identity manager 112 and authentication service 120 authenticate the user. For example, the identity manager 112 can authenticate the user in response to receiving the authentication credentials 131 of the user. The identity manager 112 can then determine whether the submitted authentication credentials 131 match the authentication credentials 131 stored for the user account 127. In response, the identity manager 112 can generate an SSO token 133 to represent the authenticated user.

The authentication service 120 can then authenticate the user with one or more of the third-party services 121 in the background. Upon successful authorization, the third-party service 121 can generate an authentication token 136 and provide it to the authentication service 120. The authentication service 120 can then cache or otherwise store the authentication token 136 for future use. The authentication service 120 can, for example, provide the authentication token 136 in response to requests from authorized applications.

At step 406, the integration service 115 receives a content query 139 from the client application 145. The content query 139 corresponds to content selected by a user in a user interface 148 associated with a first third-party service 121. For example, the content query 139 can include a character string, an image, or other type of content displayed in the user interface 148.

At step 409, the integration service 115 determines whether there is a connector 118 associated with the content query 139. For example, the integration service 115 can parse the content query 139 into one or more terms and compare the one or more terms with a list of keywords in the connector data 129. In another example, the integration service 115 can identify a structure associated with the content and compare the identified structure with a list of structures in the connector data 129. In either example, if the content query 139 matches a keyword or structure in the connector data 129, the integration service 115 can identify the connector 118 mapped to the matching keyword or structure. If the integration service 115 does not find a match between the content query 139 and a connector 118, no action is taken by the integration service 115 in response to the content query 139, and the process can proceed towards completion. However, if the integration service 115 determines a match with a connector 118, the integration service 115 proceeds to step 412.

At step 412, the integration service 115 determines if the connector 118 is enabled. For example, the user or an administrator can enable or disable connectors 118 to one or more different third-party services 121. If the connector 118 is disabled, no action is taken by the integration service 115 in response to the content query 139, and the process can proceed towards completion. However, if the integration service 115 determines that the connector 118 is enabled, the integration service 115 proceeds to step 415.

At step 415, the integration service 115 provides the respective authentication token 136 for the third-party service 121 and the content query 139 received from the client application 153 to the identified connector 118 for the respective third-party service 121.

At step 418, the integration service 115 receives a response from the connector 118. The response can include the information stored by the third-party service 121 that matches the character string included in the content query 139.

At step 421, the integration service 115 provides the received third-party service information to the client application 145. In some examples, the integration service 115 generates a user interface element 203 that includes the third-party service information received from the connector 118 and transmits the user interface element 203 to the client application 145. In other examples, the integration service 115 transmits the third-party service information received from the connector 118 and user interface code to the client application 145. The user interface code can be executed by the client device 106 to generate a user interface element 203 that includes the third-party service information. Thereafter, the process proceeds towards completion.

Figure 5:
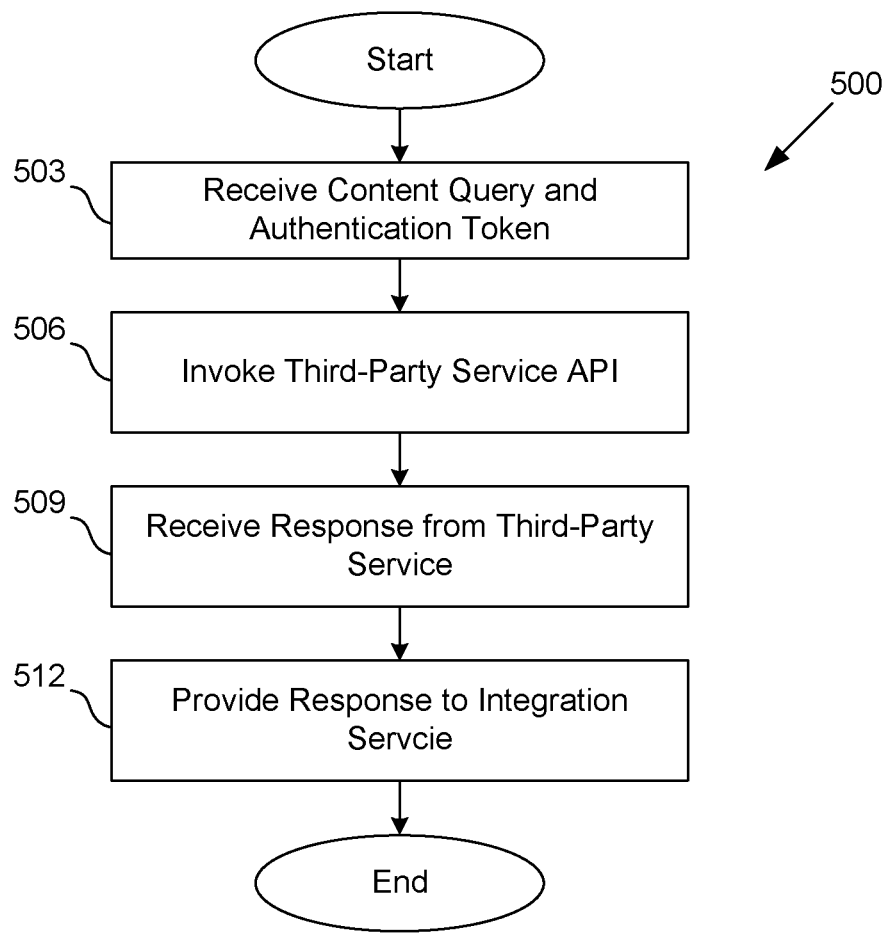
FIG. 5 is a flowchart depicting the operation of an example of a component of the computing environment of the network environment of FIG. 1.

Moving on to FIG. 5, shown is flowchart 500 that provides one example of the operation of a portion of the computing environment 103.

Beginning with step 503, the connector 118 receives from the integration service 115 at least an authentication token 136 for a third-party service 121 and a content query 139. In some implementations, the connector 118 can also receive a user identifier, such as the SSO token 133 representing the user. In some instances, the connector 118 can receive additional information from the integration service 115 for the respective third-party service 121 that the connector 118 is configured to interact with on behalf of the integration service 115.

Moving on to step 506, the connector 118 invokes one or more function calls of an application programming interface (API) provided by the third-party service 121. The connector 118 can supply the user identifier, the content query 139 or character string within the content query 139, and the authentication token 136 as values for respective arguments of one or more of the function calls.

Proceeding to step 509, the connector 118 receives a response from the third-party service 121. The response can include stored data associated with the third-party service 121. For example, if the third-party service 121 is associated with a code developing tool, the stored data can include version data, updated data, user comments, or other data associated with the development of a particular software project.

Finally, at step 512, the connector 118 returns a response to the integration service 115. The response can include information the third-party service 123 returned as matching the content query 139. In some instances, the connector 118 can reformat, translate, convert, or otherwise alter the information provided by the third-party service 121 into a format that can be used by the integration service 115. Thereafter, the process can proceed towards completion.

Figure 6:
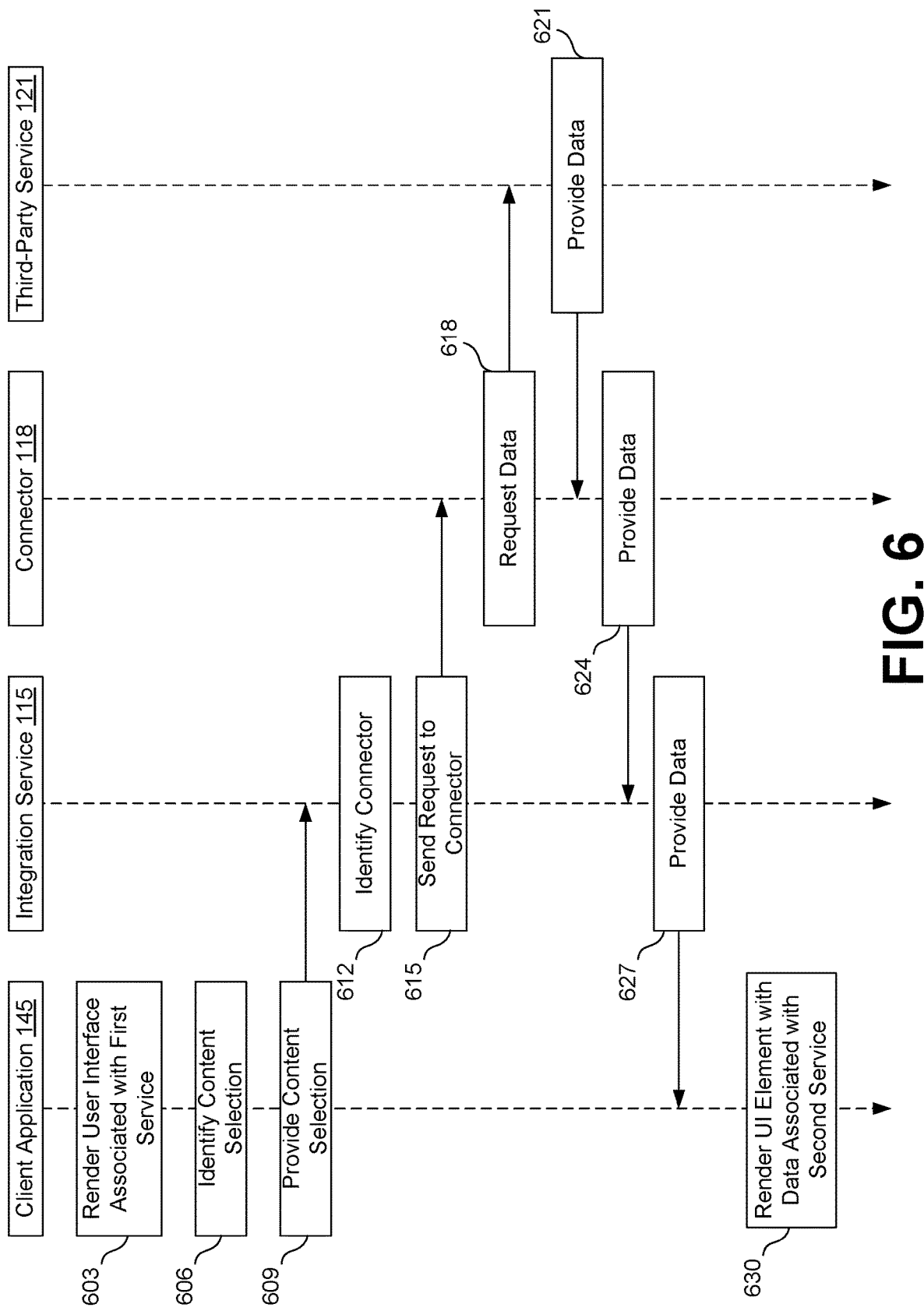
FIG. 6 is a sequence diagram depicting the operation of an example of a component of the network environment of FIG. 1.

FIG. 6 is a sequence diagram depicting an example of the interactions of various components of the network environment 100. The sequence diagram of FIG. 6 provides merely an example of the many different types of functional arrangements that can be employed to implement the portions of the network environment 100 as described herein.

Beginning with step 603, the client application 145 renders a user interface 148 associated with a first third-party service 121. For example, the client application 145 can be a browser that provides access to the first third-party service 121 in an enterprise-supported workspace. The user interface 148 includes content associated with the first third-party service 121.

At step 606, the client application 145 identifies a selection of content by the user interacting with the user interface 148. The client application 145 can detect the selection of text and determine whether the selection of text is to be transmitted to the integration service 115 to obtain additional data. For example, if the content remains selected, or otherwise highlighted, over a predefined period of time, the client application 145 can determine that the text is to be transmitted to the integration service 115 in the form of a content query 139.

At step 609, the client application 145 transmits the selected content to the integration service. In some examples, the client application 145 can transmit a user identification, a SSO token 133, or other information that can be used to identify the user and determine whether the user is authorized to access one or more third-party services 121.

At step 612, the integration service 115 identifies the connector 118 associated with the selected content. For example, the integration service 115 can compare features of the received content query 139 with the connector data 129 to determine if there is a match between the content query 139 and a keyword or structure included in the connector data 129. Upon identifying a match between a content query 139 and a structure or keyword in the connector data 129, the integration service 115 can identify the connector 118 that is mapped to the matching keyword or structure.

At step 615, the integration service 115 sends a request to the connector 118. The request can include the content query 139 along with an authentication token 136 or SSO token associated with the respective third-party service 121 to the connector 118.

At step 618, the connector 118 invokes the API of the respective third-party service 121 to retrieve the data associated with the content query 139. The third-party service 121 can be different from the third-party service 121 associated with the user interface 148 rendered at step 603.

At step 621, the third-party service 121 determines the information requested according to the content query 139 and provides the information to the connector 118.

At step 624, the connector 118 provides the received information to the integration service 115. In some examples, the connector 118 can reformat, translate, convert, or otherwise alter the information provided by the third-party service 121 into a format that can be used by the integration service 115.

At step 627, the integration service 115 provides the received data to the client application 145. In some examples, the integration service 115 generates a user interface element that includes the information provided by the second third-party service 121 and transmits the user interface element 203 to the client application 145. In other examples, the integration service 115 transmits the received second third-party service content along with user interface code that provides instructions to the client device 106 for generating the user interface element 203.

At step 630, the client application 145 renders the user interface element 203 that is associated with the second third-party service 121. In some examples, the user interface element 203 can be displayed over the user interface 148 rendered at step 603. In other examples, the user interface 148 can be modified to include the user interface element 203. For example, the user interface 148 can be modified to include a window that includes the content originally displayed in the first user interface 148 and a movable panel component associated with the content of the second third-party service 121.

In some examples, the moveable panel component can include a visible portion of content and a hidden portion of content. When a user interacts with the panel by moving the panel in a first direction, the hidden portion of the content received from the second third-party service 121 can become visible. In some examples, the exposed content of the second third-party service content can cover a portion of the window including the content included in the original user interface 148. As the panel is returned to the original position by moving the panel in a second direction, the content of the original user interface is exposed and at least a portion of the content of the user interface element is hidden.

Figure 7:
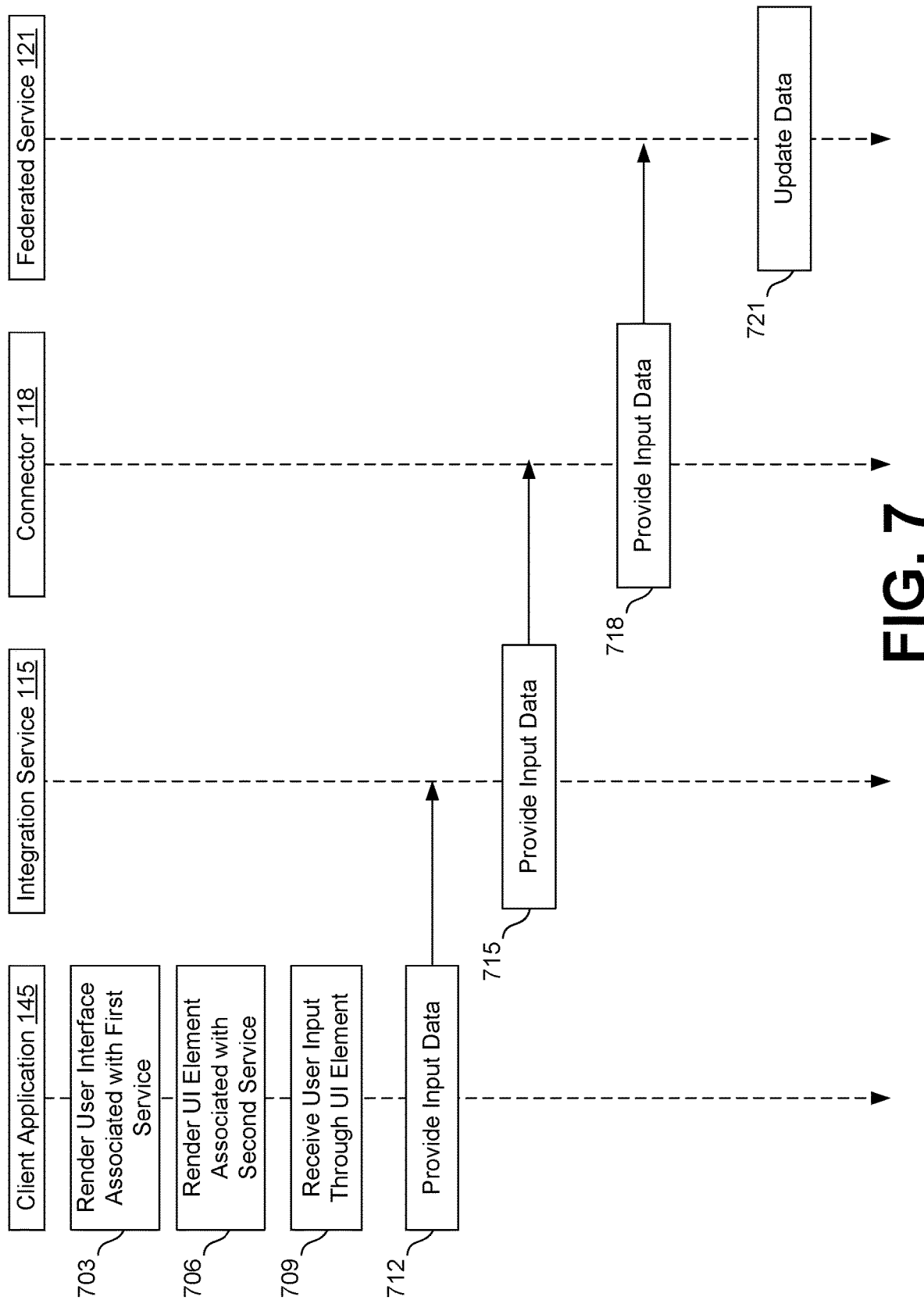
FIG. 7 is a sequence diagram depicting the operation of an example of a component of the network environment of FIG. 1.

FIG. 7 is a sequence diagram depicting an example of the interactions of various components of the network environment 100. It is understood that the sequence diagram of FIG. 7 provides merely an example of the many different types of functional arrangements that can be employed to implement the portions of the network environment 100 as described herein. As an alternative, the sequence diagram of FIG. 7 can be viewed as depicting an example of elements of a method implemented within the network environment 100 in some implementations.

Beginning with step 703, the client application 145 renders a user interface 148 associated with a first third-party service 121. For example, the client application 145 can be a browser that provides access to the first third-party service 121 in an enterprise-supported workspace. The user interface 148 includes content associated with the first third-party service 121.

At step 706, the client application 145 renders a user interface element 203 associated with the second service 121. As discussed above, the user interface element 203 includes information associated with the second third-party service 121 that is provided in response to a selection of content by the user interacting with the user interface 148 rendered at step 703.

At step 709, the client application 145 receives a user input through the user interface element 203 associated with the second third-party service 121. For example, the user interface element 203 can include selectable components, a text entry box, or other components that allows a user to interact with the second third-party service 121 while still maintaining access to the first third-party service 121. In one example, the user can be able to provide a comment associated with the information provided in the user interface element 203.

At step 712, the client application 145 provides the user input data to the integration service 115. In some examples, the client application 145 also provides the SSO token 133 or a user identifier to the integration service 115 to identify the user.

At step 715, the integration service 115 can provide the user input data to the connector 118 associated with the second third-party service 121 that has provided the information in the user interface element 203. In some examples, the integration service 115 can include the authentication token 136 or SSO token 133 to verify that the user has access to the second third-party service 121.

At step 718, the connector 118 invokes the API call associated with the third-party service 121 to provide the user input data to the third-party service 121.

At step 721, the third-party service 121 can store the data associated with the user input in the appropriate data store for the third-party service 121. For example, if the user input data includes a new comment by the user associated with the provided information, the third-party service 121 can store the comment, corresponding date, corresponding user identifier, and other pertinent data with the prior comment data.

The flowcharts of FIGS. 3-5 and the sequence diagrams of FIGS. 6 and 7 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 3-5 and the sequence diagrams of FIGS. 6 and 7 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A system for integrating related third-party services for user interaction, the system comprising:
   a client device managed by an enterprise;
   at least one application executable in the client device, wherein, when executed, the at least one application causes the client device to at least:
      identify a selection of text-based content displayed in a user interface by a user interacting with the user interface, the user interface being associated with a first third-party service of a plurality of third-party services accessible through an enterprise workspace of the enterprise, the selection of text-based content corresponding to a highlight of the text-based content in the user interface;

transmit a content query comprising text-based content highlighted by the user to an integration service on a computing device associated with the enterprise in an instance in which the text-based content has been selected over a predefined period of time;

obtain information associated with the text-based content from the integration service on the computing device, the integration service accessing the information using a particular connector associated with a second third-party service of the plurality of third-party services that is different from the first third-party service, the particular connector of the second third-party service being identified by the integration service by comparing the text-based content with connector data associated with the particular connector, the connector data comprising at least one of a keyword or a structure mapped to a respective connector of a plurality of connectors;

modify the user interface to comprise a user interface element including the information provided by the second third-party service; and render the modified user interface comprising the user interface element on the client device.

2. The system of claim 1, wherein, when executed, the at least one application further causes the client device to at least:

receive user interface code from the computing device; and generate the user interface element according to the user interface code and the obtained information.

3. The system of claim 1, wherein the user interface element comprises a pop-up box rendered over the user interface.

4. The system of claim 1, wherein the user interface element comprises a moveable panel component integrated within the user interface, movement of the moveable panel component in a first direction causing content of the user interface element to become visible, and movement of the moveable panel component in a second direction causing the content of the user interface element to be hidden.

5. The system of claim 1, wherein the selection of text-based content comprises a text string.

6. The system of claim 1, wherein the content query comprises the text-based content and a single sign-on token.

7. The system of claim 1, wherein, when executed, the at least one application causes the client device to at least:

receive user input data on the user interface element; and transmit the user input data to the integration service on the computing device, the integration service being configured to send the user input data to the second third-party service.

8. A method for integrating related third-party services for user interaction, the method comprising:

identifying, in a client device managed by an enterprise, a selection of text-based content displayed in a user interface by a user interacting with the user interface, the user interface being associated with a first third-party service of a plurality of third-party services accessible through an enterprise workspace of the enterprise, the selection of text-based content corresponding to a highlight of the text-based content in the user interface;

transmitting, by the client device, a content query comprising text-based content highlighted by the user to an integration service on a computing device associated with the enterprise in an instance in which the text-based content has been selected over a predefined period of time;

obtaining, by the client device, information associated with the text-based content from the integration service on the computing device, the integration service accessing the information using a particular connector associated with a second third-party service of the plurality of third-party services that is different from the first third-party service, the particular connector of the second third-party service being identified by the integration service by comparing the text-based content with connector data associated with the particular connector, the connector data comprising at least one of a keyword or a structure mapped to a respective connector of a plurality of connectors;

modifying, by the client device, the user interface to comprise a user interface element including the information provided by the second third-party service; and rendering, by the client device, the modified user interface comprising the user interface element on the client device.

9. The method of claim 8, further comprising:

receiving user interface code from the computing device; and generating the user interface element according to the user interface code and the obtained information.

10. The method of claim 8, wherein the user interface element comprises a pop-up box rendered over the user interface.

11. The method of claim 8, wherein the user interface element comprises a moveable panel component integrated within the user interface, movement of the moveable panel component in a first direction causing content of the user interface element to become visible, and movement of the moveable panel component in a second direction causing the content of the user interface element to be hidden.

12. The method of claim 8, wherein the selection of text-based content comprises a text string.

13. The method of claim 8, wherein the content query comprises the text-based content and a single sign-on token.

14. The method of claim 8, further comprising:

receiving user input data on the user interface element; and transmitting the user input data to the integration service on the computing device, the integration service being configured to send the user input data to the second third- party service.

15. A non-transitory computer readable medium for integrating related third-party services for user interaction, the non-transitory computer readable medium comprising machine-readable instructions that, when executed by a processor of a client device managed by an enterprise, cause the client device to at least:

identify a selection of text-based content displayed in a user interface by a user interacting with the user interface, the user interface being associated with a first third-party service of a plurality of third-party services accessible through an enterprise workspace of the enterprise, the selection of text-based content corresponding to a highlight of the text-based content in the user interface;

transmit a content query comprising text-based content highlighted by the user to an integration service on a computing device associated with the enterprise in an instance in which the text-based content has been selected over a predefined period of time;

obtain information associated with the text-based content from the integration service on the computing device, the integration service accessing the information using a particular connector associated with a second third-party service of the plurality of third-party services that is different from the first third-party service, the particular connector of the second third-party service being identified by the integration service by comparing the text-based content with connector data associated with the particular connector, the connector data comprising at least one of a keyword or a structure mapped to a respective connector of a plurality of connectors;

modify the user interface to comprise a user interface element including the information provided by the second third-party service; and render the modified user interface comprising the user interface element on the client device.

16. The non-transitory computer readable medium of claim 15, wherein the machine-readable instructions, when executed by the processor of a client device, further cause the client device to at least:

receive user interface code from the computing device; and generate the user interface element according to the user interface code and the obtained information.

17. The non-transitory computer readable medium of claim 15, wherein the user interface element comprises a pop-up box rendered over the user interface.

18. The non-transitory computer readable medium of claim 15, wherein the user interface element comprises a moveable panel component integrated within the user interface, movement of the moveable panel component in a first direction causing content of the user interface element to become visible, and movement of the moveable panel component in a second direction causing the content of the user interface element to be hidden.

19. The non-transitory computer readable medium of claim 15, wherein the selection of text-based content comprises a text string.

20. The non-transitory computer readable medium of claim 15, wherein the content query comprises the text-based content and a single sign-on token.

* * * * *